United States Patent

[11] 3,590,449

[72] Inventor Adam J. Whitley, III
8040 S. W. 109th St., Miami, Fla. 33156
[21] Appl. No. 862,799
[22] Filed Oct. 1, 1969
[45] Patented July 6, 1971

[54] APPARATUS FOR FORMING THIN, REINFORCED SHELLS OF CEMENTITIOUS MATERIAL
8 Claims, 7 Drawing Figs.
[52] U.S. Cl............................................. 25/130 S,
249/83, 25/118 H, 25/DIG. 30, 249/91
[51] Int. Cl........................................................ B22d 19/02
[50] Field of Search............................................. 249/91, 83;
25/118 H, 1 A, DIG. 22, DIG. 25, DIG. 30, 118 D,
118.5, 130 R, 130 S, 104, 118 W; 204/241, 250,
259, 271, 273, 275, 279

[56] References Cited
UNITED STATES PATENTS
772,597 10/1904 Williamson.................. 25/118 X
2,371,290 3/1945 Heltzel......................... 25/118 W
456,202 7/1891 Orr................................. 25/118 H
1,780,661 11/1930 Wedberg....................... 249/27
OTHER REFERENCES
Portland Cement Assoc., " The Motor Boat, Cement," Jan. 1918

Primary Examiner—J. Spencer Overholser
Assistant Examiner—David S. Safran
Attorney—Williams and Kreske ABSTRACT: Apparatus for forming thin cementitious shells, such as boat hulls, having metal reinforcement mesh embedded therein. The invention utilizes a mold having a forming surface complementary to that of the shell to be formed and is provided with longitudinally extending, spaced-apart spacer members for supporting the reinforcement in spaced relation from the forming surface of the mold. Elongated guides are removably secured to respective spacer members, with the reinforcement interposed therebetween, and such guides provide a dual function of retaining the reinforcement in position on the mold while the reinforcement is embedded in a plastic cementitious material and also provide surfaces for guiding a smoothing and compacting device over the cementitious material whereby complex, curved contours of the desired thickness can readily be formed by relatively unskilled workmen.

After the cementitious material has at least partially set, the guides are removed and the resulting grooves in the shell are filled with additional plastic cementitious material and the latter faired to the previously applied material. When the thus formed body has set up sufficiently to permit handling, it will be removed from the mold and the grooves resulting from the spacer members will be filled with cementitious material and the latter faired into the adjacent cementitious material.

PATENTED JUL 6 1971
3,590,449
SHEET 1 OF 3
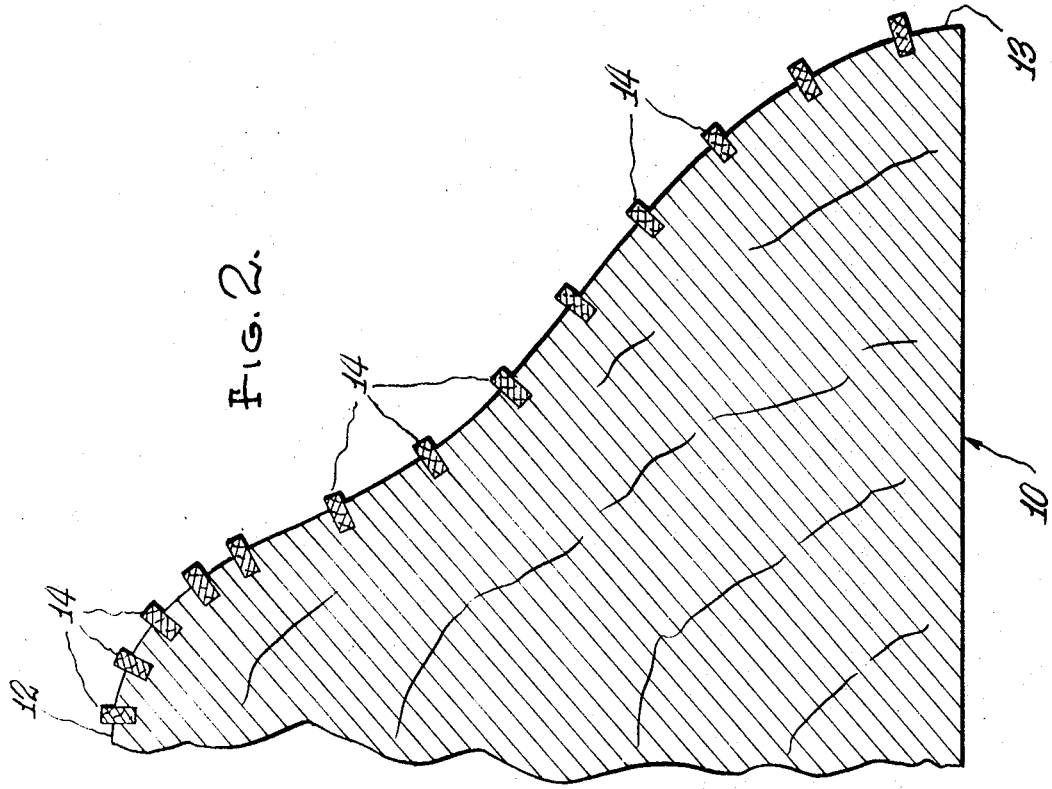
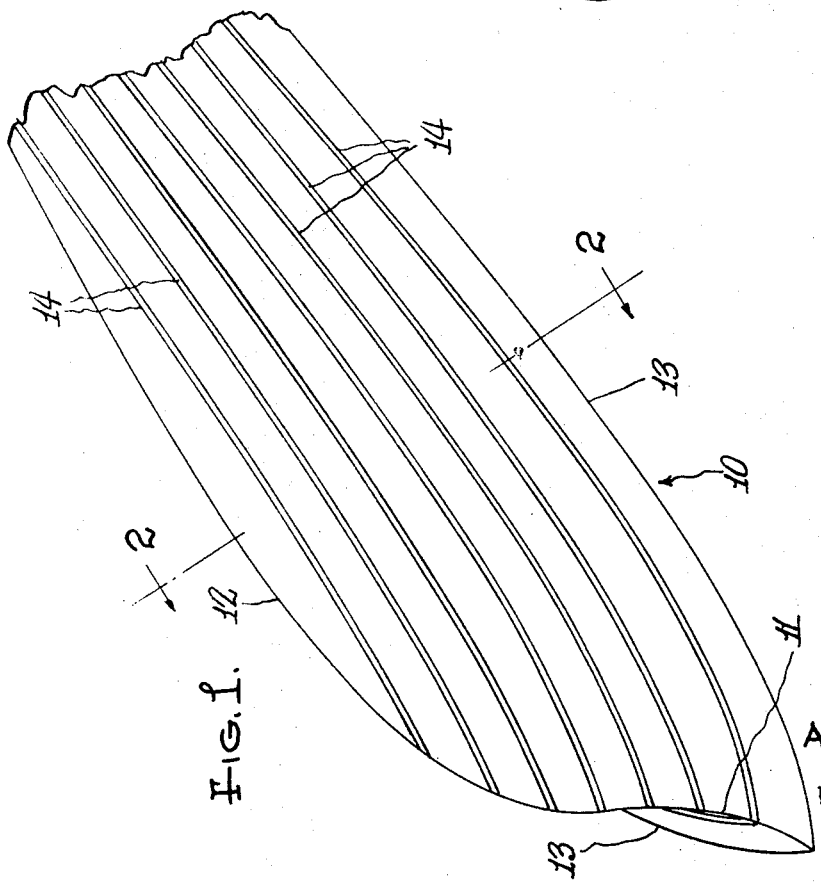
INVENTOR.
ADAM J. WHITLEY III
BY Williams and Kreske
ATTORNEYS

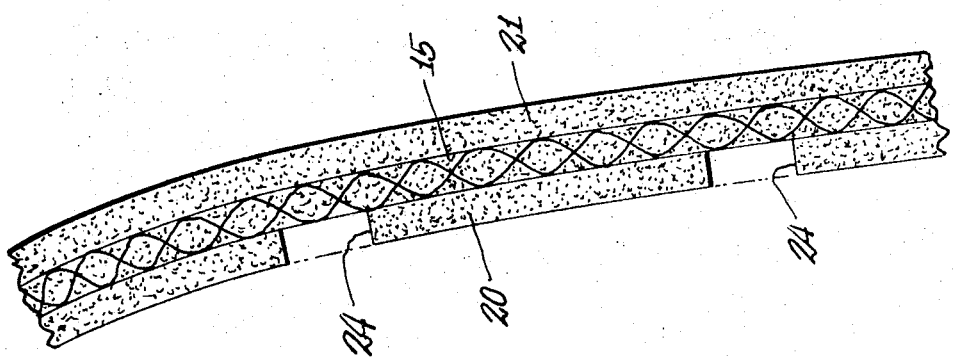
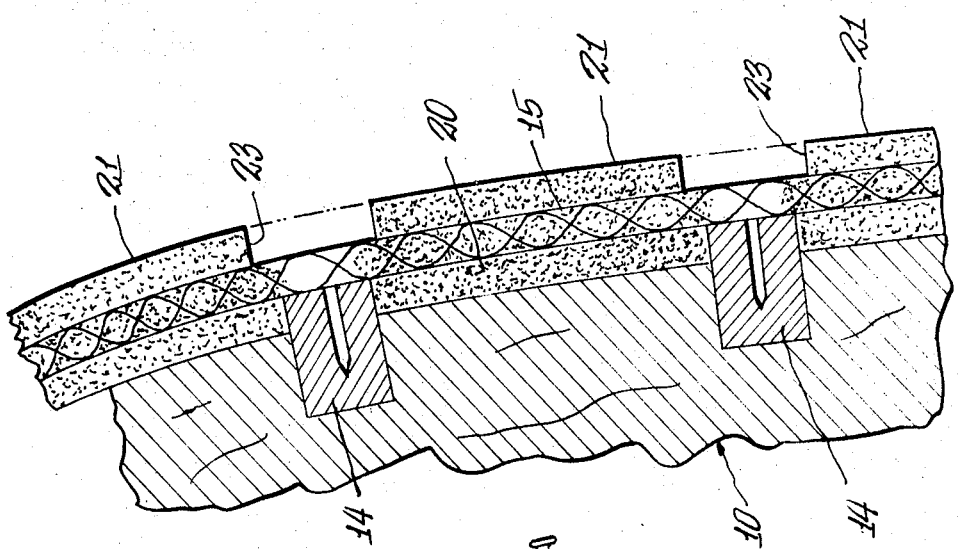
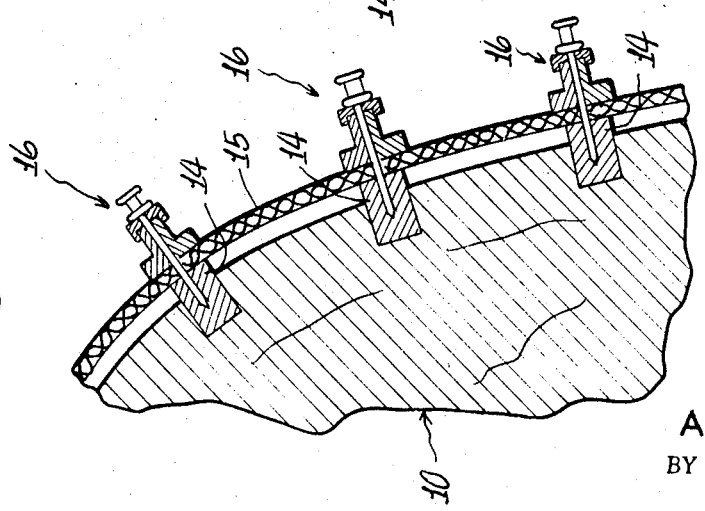
INVENTOR.
ADAM J. WHITLEY III

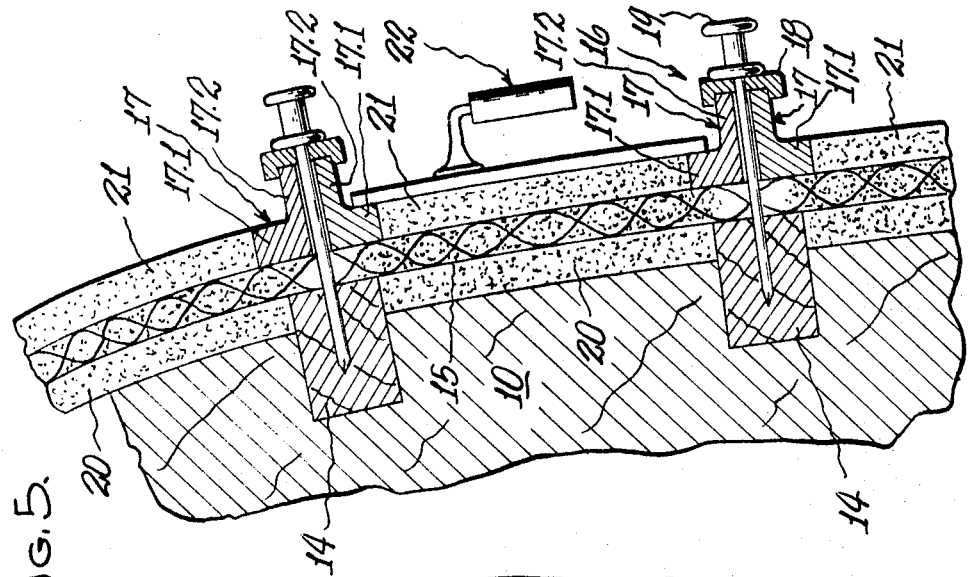
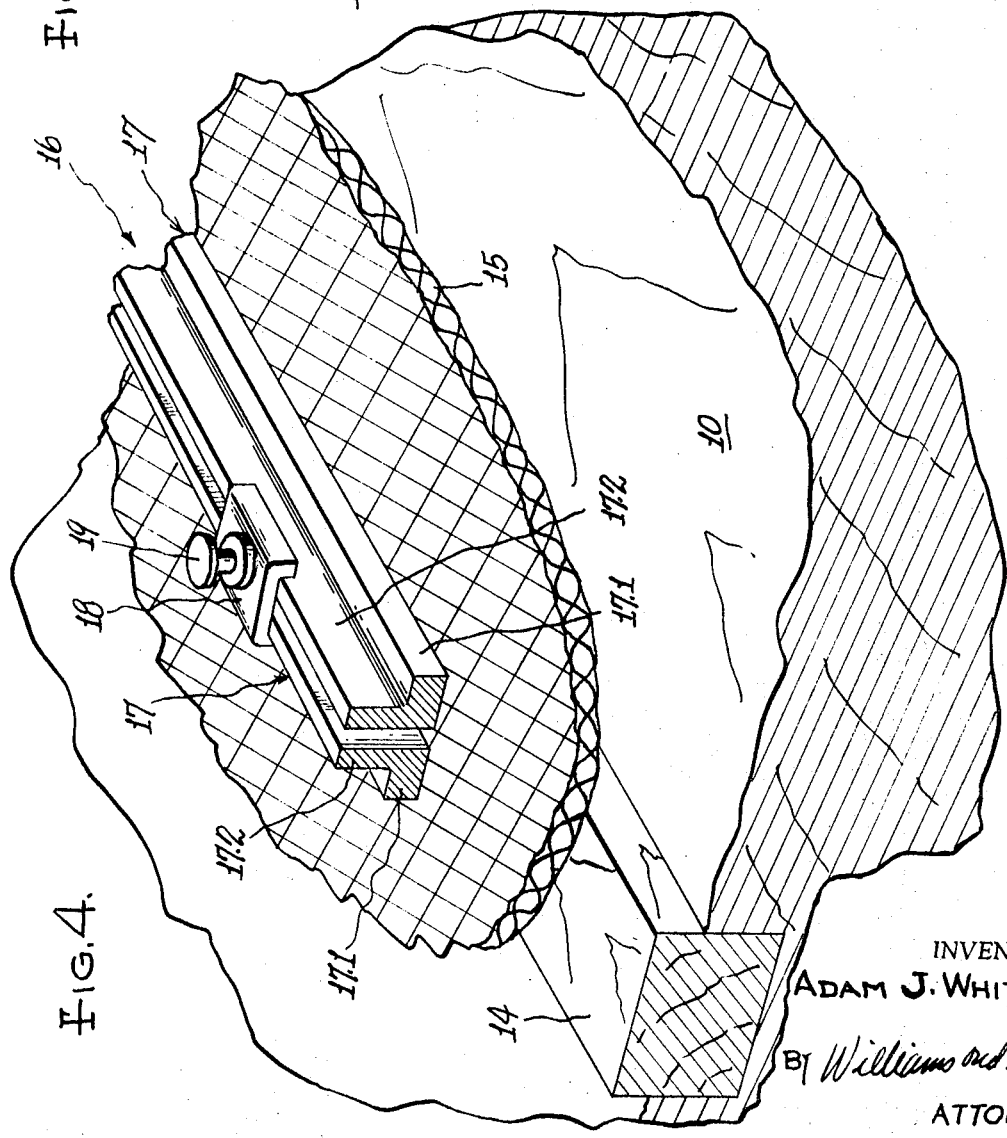

APPARATUS FOR FORMING THIN, REINFORCED SHELLS OF CEMENTITIOUS MATERIAL

BACKGROUND AND SUMMARY

There is prior art in the manufacturing of thin walled concrete shells in which is embedded metallic reinforcement of one kind or another. While such shells have frequently been formed on or in molds, the completion of quality product "show" surfaces has necessitated use of much skilled labor of a most scarce type. The type labor referred to is that employed to finish the exposed cement surfaces to the desired smoothness, thickness and contour. When such shells are in the form of a boat hull, the usual complex curvatures and the thickness of the cement present a challenge which taxes the ability of even highly skilled workmen.

Even when the most skilled workmen are employed, prior art methods and apparatus frequently resulted in bodies whose thickness varied from area to area. Too great a thickness, of course, adds undesirable weight, while too little thickness results in a loss of structural strength. A problem of at least equal magnitude in prior art apparatus and prior art methods has been the difficulty of maintaining proper embedment of reinforcement within the cement.

The present invention, in contrast with the prior art, insures proper embedding of the reinforcement material and makes it possible for relatively unskilled labor to execute complex surface contours while maintaining the desired optimum thickness of cement over the embedded reinforcement material.

The above advantages are provided by using a mold having a forming surface complementary to the shell to be formed. The mold has a plurality of elongated spacer members in spaced side-by-side relation and each spacer member projects beyond the mold surface an amount equal to the desired thickness of the layer of cement to be interposed between the mold surface and the embedded reinforcement.

The reinforcement is adapted to be removably secured to respective spacer members by respective elongated guide members which extend along respective spacer members. The guide members have guide surfaces spaced from the reinforcement an amount equal to the desired thickness of the layer of cementitious material to be applied over the reinforcement and, when a smoothing and compacting device, such as a trowel, is moved along respective adjoining guide surfaces, cement disposed therebetween can be smoothed to even the most complex contour by a workman of little skill or experience. These and other advantages will readily become apparent from a study of the following description and from the appended drawings.

DRAWING DESCRIPTION

In the drawings accompanying this specification and forming a part of this application there is shown, for purpose of illustration, an embodiment which the invention may assume, and in these drawings:

FIG. 1 is a fragmentary perspective view of a mold for use in making a reinforced concrete boat hull in accordance with the instant invention, FIG. 2 is a fragmentary, enlarged sectional view generally corresponding to the line 2-2 of FIG. 1, FIG. 3 is a fragmentary view similar to FIG. 2 but still further enlarged and at a subsequent stage of use.

FIG. 4 is a fragmentary perspective view of the parts seen in FIG. 3,

FIG. 5 is a still further enlarged view similar to FIG. 3 but at a still later stage of use, and FIGS. 6 and 7 are views similar to FIG. 5 but at still later stages of shell construction.

DETAILED DESCRIPTION

While the invention will hereinafter be described in connection with the manufacture of boat hulls, it is to be understood that it is equally applicable to manufacture of any thin, concrete body in which reinforcement material is embedded.

With reference to FIG. 1, there is fragmentarily illustrated a male or plug mold 10 in the form of an inverted boat hull having a bow 11, a keel 12 and gunwales 13. Extending longitudinally of the mold 10; that is, from bow to stern thereof, are a plurality of elongated spacer members 14 in spaced, side-by-side, parallel relation which will hereinafter be described in greater detail.

As best seen in FIG. 2, each spacer member comprises an elongated bar tightly fitted into a slot formed in the mold 10 and each bar projects outwardly of the mold surface for a purpose to appear. At the present time, each bar 14 is formed of wood because of its ability to receive and removably retain fastening members such as nails; however, other materials might well be used instead.

Upon the spacer bars 14, and as best seen in FIG. 3, one or more layers of reinforcement such as metal mesh 15 is disposed and held in position by retainer-guide assemblies 16. The arrangement is such that the reinforcement 15 will be spaced slightly from the mold surface by the spacers 14 but will closely follow the mold contours. As indicated in FIG. 2, the spacing between adjoining spacer bars 14 may vary depending upon the degree of support required by the reinforcement. For example, where hull curvature changes rapidly it may be necessary to dispose the spacer bars more closely together than where hull curvatures are more gentle.

With reference to FIGS. 3 and 4, each retainer assembly 16 is herein disclosed as being formed of a pair of elongated angle members 17 each having a base leg 17.1 and a back leg 17.2. The angles 17 of each angle member pair are disposed in closely spaced, back-to-back relation with their base legs extending along and overlying respective spacer bars 14. At suitably spaced intervals along the pairs of angle members, the angle member back legs are spanned by a U-shaped clip 18. A double-headed nail 19 extends through an aperture in each clip, between the angle members 17, through the reinforcement 15, and into respective spacer bars to retain reinforcement 15 in close conformity with, but slightly spaced from, the mold surface. It will be understood that the angle members 17 have sufficient flexibility that they will conform to the spacer bars 14 to which they are nailed.

With the blanket of reinforcement 15 thus held in proper relationship to the mold exterior surface as seen in FIG. 5, a flowable, homogeneous mixture of cementitious material is applied thereto by any suitable means to thoroughly permeate the interstices of the reinforcement and form an underlying, compact layer of cementitious material 20 between the mold exterior surface and the reinforcement and a compact overlying layer of cementitious material 21. The contour of the cementitious layer 20, of course, is established by the mold exterior surface while the thickness of such layer is a function of the distance the reinforcement 15 is supported away from the mold surface by the spacer bars 14. The thickness and contour of the overlying cementitious layer 21 is established in the following manner:

Still referring to FIG. 5, the cementitious material layer 21 will be compacted, smoothed and contoured by passing a device such as trowel 22 thereover while guiding the latter along the outwardly facing surfaces of the adjoining angle base legs 17.1. The thickness of the angle base legs 17.1 establishes the thickness of the cementitious layer 21 and by using the angle base legs 17.1 as guides, a workman of little experience can trowel the cement layer 21 smooth while insuring proper thickness and contour thereof. Establishment of the proper contour of the cementitious layer 21 may be facilitated by using a trowel 22 with a rather flexible blade and/or one whose blade has a curvature generally corresponding to that of the surface to be smoothed.

When the cementitious material thus far deposited and smoothed has taken at least a partial set, the nails 19 will be withdrawn (this being facilitated by their double-head construction) and the retainer-guide assemblies 16 removed. This, as seen in FIG. 6, will leave grooves 23 in the outer layer 21 of the shell. Each of the grooves 23 may next be filled with more plastic cementitious material, making certain no voids remain in the underlying mesh, and this newly applied material will be faired to the previously applied, adjoining material (as indicated by the phantom lines) with a suitable trowel or the like.

When the shell thus far formed has been set up sufficiently for handling, it will be removed from the mold and the grooves 24 (FIG. 7) which were formed by the spacer bars 14, may be filled with still further plastic, cementitious material which can be faired, if desired, to the adjoining partially set up material as indicated by the phantom lines. Upon curing, the thus described shell may be placed into service or further outfitted as the case may be.

Under some circumstances, certain spacer bars 14 may interlock with the partially cured shell and thus tend to prevent its separation from the mold. In the event this circumstance should arise, it will only be necessary to form such spacer bars with the required draft (not shown) to permit ready separation of the shell and the mold.

After repeated use of the mold, the spacer bars 14 may become too splintered or damaged for further use. When this occurs, it is only necessary to remove such bars from their grooves in the mold and replace them with new spacer bars.

I claim:

1. In the manufacture of thin, reinforced cement shells, the combination comprising a mold having a forming surface complementary to the shell to be formed, a plurality of spacer members carried by said mold and projecting outwardly of said mold forming surface, means for holding a layer of reinforcement closely fitted to the contour of said mold surface but speed slightly therefrom by said spacer members an amount equivalent to the desired thickness of a layer of cementitious material to be applied under said reinforcement, and a plurality of elongated guides removably secured to said spacer members with said reinforcement interposed therebetween to retain the latter in position, said guides being disposed in spaced, substantially parallel relation for spanning by a smoothing device which is to be moved along and guided by outwardly facing portions of said guides to smooth the cementitious material, adjacent, outwardly facing portions of aforesaid adjoining guides being spaced from said reinforcement an amount equivalent to the desired thickness of a layer of cementitious material to be applied over said reinforcement.

2. The construction of claim 1 wherein said spacer members are elongated and wherein said guides extend along respective spacer members.

3. The construction of claim 2 wherein said guides are transversely flexible to conform to the contour of respective spacer members.

4. The construction of claim 1 wherein said spacer members are formed of material adapted to receive and retain nails driven thereinto, and wherein readily withdrawable nails are employed to removably secure said guides to said spacer members.

5. The construction of claim 4 wherein said spacer members are removably secured to said mold for ready replacement when they become too damaged for further use.

6. The construction of claim 1 wherein each guide aforesaid comprises a pair of angle members in spaced-apart, back-to-back relation, and wherein fastening members are disposed between the angles of said angle pairs and are removably anchored in respective spacer members to removably secure said guides to said spacer members.

7. The construction of claim 6 wherein hold down means are held in position by said fastening members, and wherein such means span the angles of a respective angle pair and are engaged therewith to interlock such angle members with respective fastening members.

8. The construction of claim 7 wherein said fastening members have a shank portion passing through respective hold down means and a headed portion overlying such hold down means, and wherein said means last mentioned have an intermediate portion extending between respective angles and lip portions extending transversely from said intermediate portion and engaged with respective angle members.

UNITED STATES PATENT OFFICE
CERTIFICATE OF CORRECTION

Patent No. 3,590,449  Dated July 6, 1971

Inventor(s) Adam J. Whitley III

It is certified that error appears in the above-identified patent and that said Letters Patent are hereby corrected as shown below:

On the cover sheet insert -- [73] Assignee Seaferro, Inc., Miami, Florida --.

Signed and sealed this 4th day of January 1972.

(SEAL)
Attest:

EDWARD M. FLETCHER, JR.  ROBERT GOTTSCHALK
Attesting Officer  Acting Commissioner of Patents